United States Patent [19]

Berndt

[11] 4,208,802
[45] Jun. 24, 1980

[54] LEVEL INDICATING DEVICE FOR WALL-MOUNTED PICTURES

[76] Inventor: Stephen R. Berndt, 16204 - 143rd Pl. SE., Renton, Wash. 98055

[21] Appl. No.: 7,377

[22] Filed: Jan. 29, 1979

[51] Int. Cl.² .............................................. G01C 9/28
[52] U.S. Cl. .......................................... 33/347; 33/371
[58] Field of Search ................. 33/333, 334, 347, 370, 33/371

[56] References Cited
U.S. PATENT DOCUMENTS

| 3,422,544 | 1/1969 | Wyse | 33/333 |
| 3,766,657 | 10/1973 | Hopkins | 33/371 X |

Primary Examiner—Charles E. Phillips
Attorney, Agent, or Firm—Seed, Berry, Vernon & Baynham

[57] ABSTRACT

A mounting plate is attached to a picture frame and holds a removable liquid bubble level. The plate can be sheared by pushing the frame toward the wall. A card is provided for packaging several mounting plates with a single bubble level.

11 Claims, 5 Drawing Figures

LEVEL INDICATING DEVICE FOR WALL-MOUNTED PICTURES

BACKGROUND OF THE INVENTION

1. Field of the Invention

The present invention relates to a device to assist in leveling wall-mounted pictures and other objects and to keep them in leveled condition.

2. Description of the Prior Art

Picture frames are commonly hung by wire from one or two wall-mounted hooks and are adjusted after hanging to achieve a level condition of the top and bottom edges and a vertical condition of the side edges. Such picture leveling has normally been accomplished by adjusting it back and forth by eye until it appeared to be level from a distance, by measuring from a known vertical edge such as a door or window frame or room corner, or from a known level such as the floor or ceiling. In some instances a level indicating device has been used such as a spirit level placed against one edge of the frame to determine whether or not the adjustment has leveled the picture. This requires that the person hanging the picture either hold onto the level with one hand and attempt to adjust the picture with the other hand, which can be a difficult maneuver, or to set the level down, trial adjust the picture with both hands, and then check it with the level.

SUMMARY OF THE INVENTION

The present invention aims to provide a simple, inexpensive, disposable level indicating device to assist in hanging a picture or the like which will not need to be held by the person hanging the picture and will indicate to such person the level condition of the frame while it is being adjusted to achieve a level condition.

Another object of the invention is to provide a device which will assist in keeping the picture level after it has been hung and initially adjusted to a level position.

A further object of the invention is to provide a level indicating device achieving the foregoing objectives, and in which the level conditions is indicated by a level tube which can be reused.

In carrying out the objects of the invention there is provided a disposable holder and a reusable level tube held in a pocket presented by the holder. The holder has a mounting plate at the top which is secured against the back of the bottom rail of the picture frame in a position parallel to the bottom edge of the frame. The back of the holder adjoining the pocket rests against the wall at a location beneath and to the rear of the mounting plate and holds the mounting plate and bottom of the picture away from the wall. When the picture is adjusted to a level condition the holder is severed from the mounting plate by pressing rearwardly on the lower rail of the frame thereby moving the mounting plate into engagement with the wall. The back face of the mounting plate has a friction surface or adhesive to assist in maintaining the picture level.

BRIEF DESCRIPTION OF THE DRAWINGS

In the accompanying drawings.

DETAILED DESCRIPTION OF THE PREFERRED EMBODIMENTS

Figure 1:
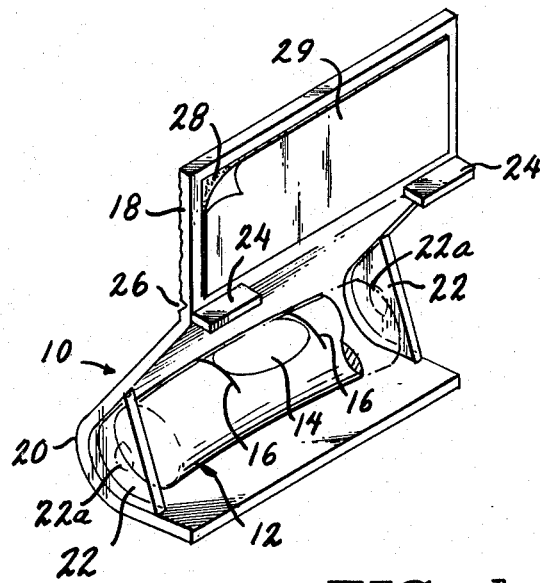
FIG. 1 is a front perspective view of a level indicating device with a level tube in position in accordance with the prsent invention.

Referring to FIG. 1, it is seen that the level indicating device of the present invention has a holder 10 and a level tube 12 of the type in which a bubble 14 is centered between a pair of lines 16—16 when the longitudinal axis of the tube is level. The holder 10 is preferably injection-molded as one peice of a relatively brittle plastic material and is shaped to provide a flat mounting plate 18, a trough-like pocket member 20 with end walls 22—22, and a pair of coplanar rigid aligning prongs 24—24. It is important to note that the lower edge of the mounting plate 18 is defined by a V-groove 26 formed in the back of the holder 10 immediately above the upper level of the prongs 24 to define a break-off line.

Figure 2:
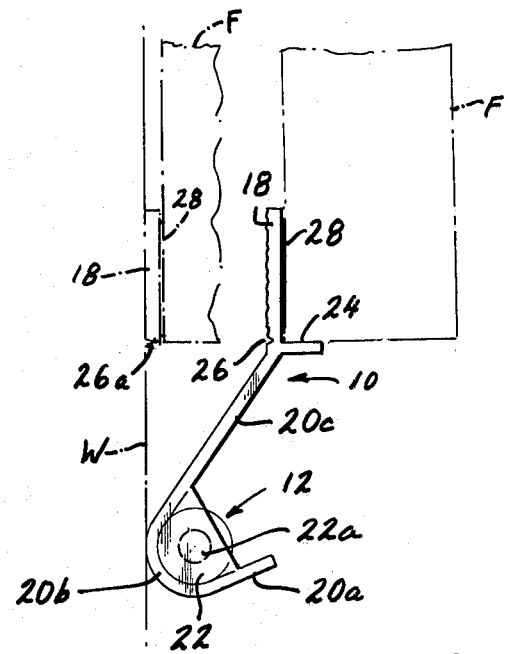
FIG. 2 is a side elevational view showing the device in initial position (full lines) on a picture frame and also illustrating (in phantom) the mounting plate in wall engaging position after being severed from the rest of the device.

As best seen in FIG. 2, the pocket member 20 has a front wall 20a, a curved central portion 20b having its inner face formed by a radius matching that of the cylindrical housing of the level tube 12, and a flat back wall 20c wider than the front wall 20a in the vertical direction and extending from the end walls 22 to the V-groove 26. This back wall 20c forms an obtuse angle with the mounting plate 18 so that when the latter is generally vertical, the central portion 20b is displaced to the rear and below the mounting plate 8.

Of significance is the fact that the upper sides of the prongs 24—24 define a mounting plane or axis for the holder 10 which is parallel to the longitudinal axis of the generally U-shaped central portion of the pocket member 20. Hence, when the level tube 12 is placed in the pocket member, the longitudinal axis (level axis) of the level tube will be parallel to the mounting axis of the holder as defined by the prongs 24. This, of course, means that when the bubble 14 in the level tube 12 is centered to indicate a horizontal position of the tube, the upper faces of the prongs 24—24 will collectively provide a level (horizontal) mounting axis or surface which, in the practice of the present invention, is intended to engage the underside of the bottom rail of a picture frame F while the front face of the mounting plate 18 is seated against the rear face of the rail as indicated in FIG. 2. When the holder 10 is thus positioned, a level indication by the bubble of the level tube 12 signals that the picture frame F is in a level position. The end walls 22 may be provided with inwardly protruding dimples 22a to snugly engage the ends of the level tube 12.

As part of the present invention the front of the mounting plate 18 is preferably provided with layer 28 of a suitable pressure-sensitive adhesive which will readily bond to wood, metal and painted surfaces. This layer is covered by a protective removable strip 29 during storage of the holder 10. The back face of the mounting plate may be molded with a roughened surface 18a which will resist sliding movement of the mounting plate relative to a room wall surface engaged by the roughened surface. As alternatives, the back face may be provided with a suitable layer 30 of pressure sensitive adhesive and a removable cover strip 32 for lightly holding the mounting plate 18 to the room wall surface, or a suitable friction pad of sponge rubber or sand paper, for example, may be secured to the back face of the mounting plate to resist sliding movement thereof relative to wall surfaces.

In the use of the level indicating device, the mounting plate 18 is secured by the adhesive 28 to the rear face of the bottom rail F of a picture frame after positioning the holder so that the prongs 24 both engage the underside of the rail. The picture is hung in conventional manner from a picture hook or other supporting device mounted on the room wall W and the rearwardly and downwardly projecting central portion 20b of the pocket member 20 is placed in engagement with the wall W as shown in FIG. 2. Then, after the level tube 12 is placed in the forwardly exposed pocket presented by the central curved portion 20b and the end walls 22 of the holder 10, the picture frame is adjusted until the bubble 14 is centered between the indicating lines 16, thereby showing that the picture is in a leveled position. Next the bottom rail F of the frame is manually pushed inwardly toward the wall by applying pressure thereto in the region of the holder 10. This pressure causes the holder to bend at the groove 26 such that the obtuse angle between the mounting plate 18 and the wall 20c increases as the bottom rail F moves toward the wall W. As the plate 18 and rail F approach the wall the holder 10 fractures along the groove 26 and the pocket member 20 breaks free of the mounting plate 18. The resulting bottom fracture edge 26a on the mounting plate 18 is hidden by the rail F. To assist in ready fracturing along the bottom of the mounting plate, portions of the groove line 26 may be cut completely through during the molding of the device.

Figure 3:
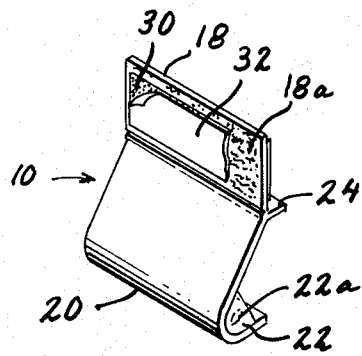
FIG. 3 is a rear perspective view of the device to a reduced scale and with optimal adhesive coated tape shown fragmentarily.

After the pocket member 20 breaks free the mounting plate 18 engages the wall W and the picture frame is maintained in its leveled position by the contact between the roughened back face 18a of the mounting plate and the wall surface. As indicated in FIG. 3, as an alternative to the roughened back face 18a, the user can apply pressure-sensitive adhesive 30 to the back face of the mounting plate 18 by using double-sided pressure-sensitive tape. One protective cover strip of the rear tape is removed to expose the adhesive to apply it to the mounting plate 18 and then the other protective cover strip 32 is removed when the level indicating device is to be used.

Figure 4:
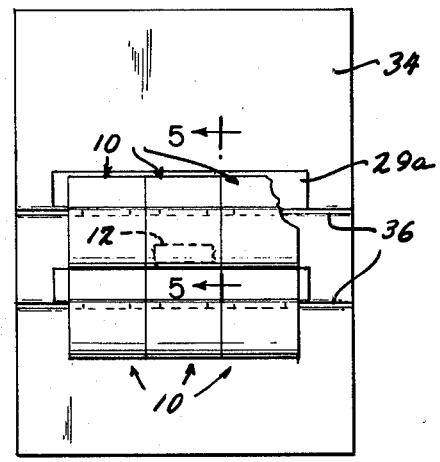
FIG. 4 is a plan view of a mounting card for storing several of the devices.
Figure 5:
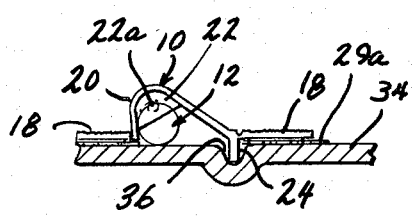
FIG. 5 is a sectional view taken as indicated by line 5—5 in FIG. 4.

One of the advantages of the invention is that the level tube 12 can be reused. To this end, it is intended that several of the holders 10 be marketed with a single level tube 12. A suitable novel packaging arrangement for this purpose is shown in FIG. 4 wherein numeral 34 identifies a mounting card for a display rack. This card is formed with a groove 36 for each row of holders 10, two such rows being shown by way of example. The grooves 36 are of a depth corresponding to the projecting width of the prongs 24. It is preferred that the card 34 also be provided with strip areas 29a adjoining the grooves 36 which are surfaced so that the pressure-sensitive adhesive 28 on the holders 10 will not bond thereto. With the described card arrangement the holders 10 can be placed face down on the card 34 without use of protective cover strips 29 by positioning the prongs 24 in the grooves 36 and the front adhesive-covered faces of the mounting plates 18 against the strip areas 29a. As best shown in FIG. 5, a level tube 12 is placed in one of the holders 10. The card 34 can then be covered by a transparent sheet as is well known in the "bubble pack" art. The pack can also contain a double-sided adhesive strip as an alternative to using the rough face 18a, or a strip of sand paper, sponge rubber or some other friction strip having one face coated with pressure-sensitive adhesive covered by a removable protective strip.

From the foregoing description it is believed clear that the mounting plate 18 performs two functions: (1) it retains the pocket member 20 in proper position relative to the picture frame while it is being moved into a level position, and (2) it resists movement of the picture frame out of its level position by way of its frictional engagement with or adhesion to the room wall.

Although the invention has been described as used for leveling picture frames, it will be appreciated that the holder 10 and associated level tube 12 can be used in the leveling of other wall-mounted objects. It is also to be understood that the device may be used in carpentry to establish levels, in which case the pocket member 20 need not, in some applications, be broken away from the mounting plate 18, but by use of the proper adhesive on the mounting plate, may be removed as a unit for further use.

I claim:
1. A leveling device comprising:
a holder having a pocket for a level tube and having an upright mounting plate spaced above the pocket and spaced forwardly of the rear of the pocket,
guide means at the front of the holder adjacent the bottom of the mounting plate for properly positioning the holder on an object to be leveled, and
securing means for holding said mounting plate on said object after the holder has been positioned thereon,
said holder having a reduced cross-sectional area above said guide means whereby the pocket may be readily severed from the mounting plate by the force applied by pressing the object rearward toward the mounting plate while the back of the holder at the rear of the pocket bears against a wall.
2. A leveling device according to claim 1 in which said guide means comprises a pair of spaced forwardly projecting prongs arranged to have a line of contact with the underside of said object which is level when a level tube in said pocket is level.
3. A leveling device according to claim 2 in which said prongs are adapted to readily break free of said holder when said object is pressed rearwardly as described in claim 1.
4. A leveling device according to claim 1 in which said reduced cross-sectional area is located between said guide means and said mounting plate.
5. A leveling device according to claim 1 in which said pocket is trough-like and open at the front of the holder.
6. A leveling device according to claim 5 in which the rear wall of the pocket is wider than the front wall thereof in the vertical direction and slopes upwardly and forwardly to said mounting plate to form an obtuse angle therewith.
7. A leveling device according to claim 5 in which said pocket has end walls.
8. A leveling device according to claim 1 in which said mounting plate has a roughened back face.

9. A leveling device according to claim 1 in which said securing means comprises adhesive on the front face of said mounting plate.

10. A leveling device according to claim 1 in which said mounting plate has adhesive on its front and back faces.

11. A leveling device comprising:
a mounting plate,
a wall sloping downwardly and rearwardly at an obtuse dihedral angle from the bottom of the mounting plate,
a level tube carried by the wall at the front and bottom portion thereof, and
guide means projecting forwardly at the top of the wall for properly positioning the mounting plate on an object to be leveled,
said wall having a reduced cross-sectional area at the bottom of the mounting plate whereby the wall, guide means and level tube may be readily severed from the mounting plate by applying a force against the front of the mounting plate while the lower end of the wall bears against a support.

* * * * *